Patented Jan. 9, 1923.

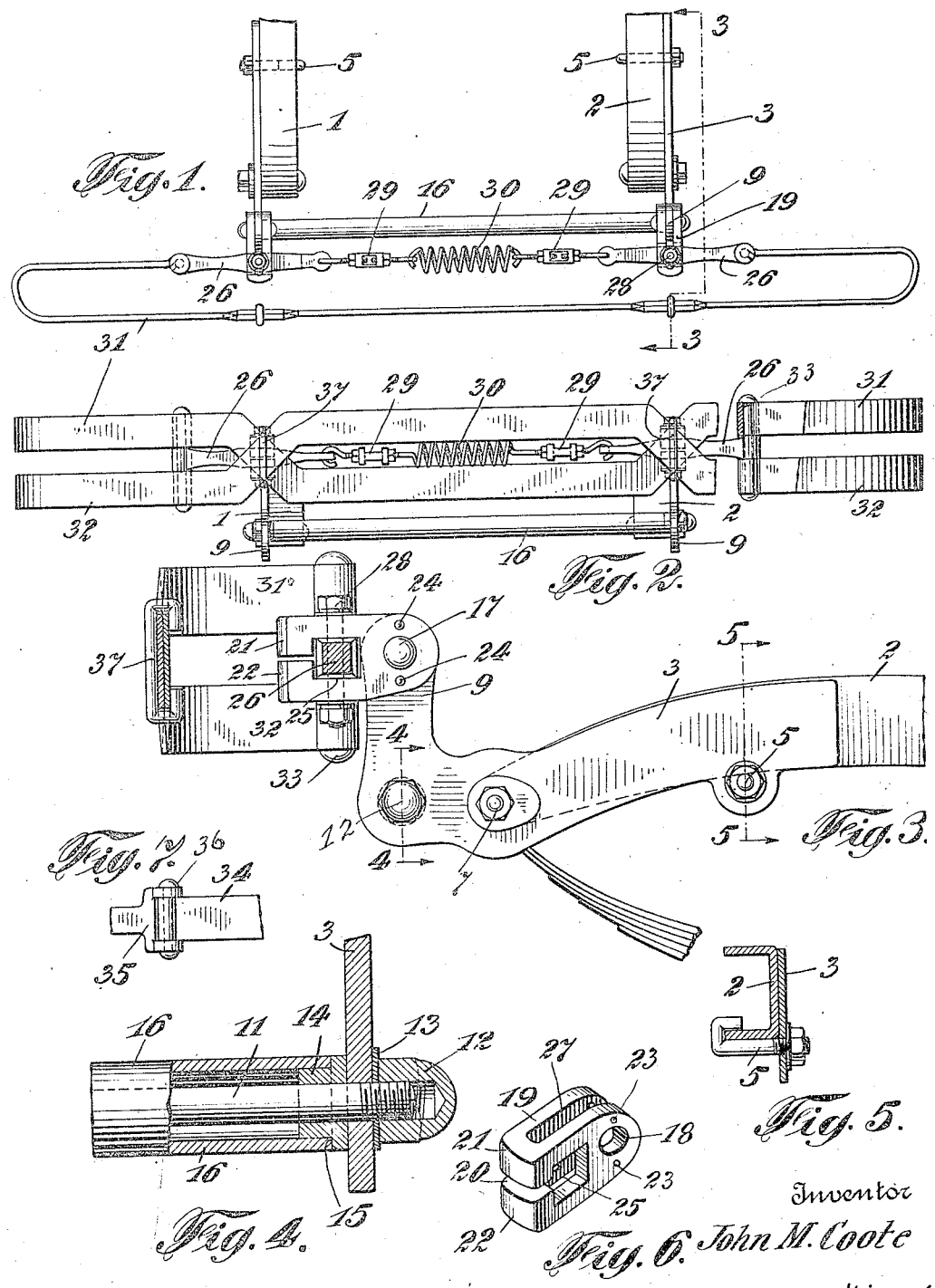

1,441,400

UNITED STATES PATENT OFFICE.

JOHN M. COOTE, OF ELIZABETH, NEW JERSEY.

AUTOMOBILE BUMPER.

Application filed October 2, 1922. Serial No. 591,705.

*To all whom it may concern:*

Be it known that I, JOHN M. COOTE, a citizen of the United States, and resident of Elizabeth, in the county of Union and State of New Jersey, have invented certain new and useful Improvements in Automobile Bumpers, of which the following is a specification.

This invention is an improved bumper for use on automobiles or other vehicles, and involves improvements in the bumper bar construction as well as improvements in the mechanism for supporting or attaching the bumper bar.

My improved bumper bar is preferably formed of spring steel of such cross section that it will yield in a substantially horizontal direction but is substantially rigid against vertically acting forces.

One object of my invention is to provide a bar construction which presents an impact face or surface of greater vertical dimensions than that of the usual single bar, but which is of substantially uniform height throughout its length, and with the individual bars or bumper elements rigidly secured together in a very simple manner at a plurality of points to reinforce each other.

A further object is to provide auxiliary yielding means whereby the bumper may move bodily under light impact and may offer yielding resistance by its own bending when greater force is brought to bear. Thus the resistance increases as the force of the blow or impact increases.

A further object is to so mount the lever mechanism that supports the bumper bar that it is protected by the bar and moves in a substantially horizontal plane in the rear of the bar.

A further object is to so interconnect the levers which support the bar at spaced points that they may operate independently, but each aids in the operation of the other, and a single auxiliary spring resists movement of both levers.

A further object is to provide a bumper supporting mechanism which may be easily and quickly attached, and which acts to strengthen the front of the vehicle frame.

The accompanying drawings illustrate merely one embodiment of my invention. In these drawings:

Fig. 1 is a plan view of the bumper attached to the end of an automobile.

Fig. 2 is a front elevation of the bumper.

Fig. 3 is a vertical section taken on the line 3—3 of Fig. 1, but on a larger scale.

Fig. 4 is a vertical section taken on the line 4—4 of Fig. 3, but on a larger scale.

Fig. 5 is a section taken on the line 5—5 of Fig. 3.

Fig. 6 is a perspective view of a clamping member adapted to engage certain elements of the bumper, and Fig. 7 is a detail elevation of a modified construction which may be used with a bumper having a single leaf.

The bumper may be attached to either end of an automobile, or other vehicle, and secured to the frame members such as the spring horns 1 and 2 which are illustrated as of channel bar construction. To the side of each frame member a plate 3 is secured in any suitable manner. Merely as an example I have shown the plate 3 as provided near one end adjacent to its lower edge with an aperture through which a hooked bolt 5 extends to engage the lower edge frame member. Near its forward end the plate is provided with an aperture which embraces the projecting boss on the end of the frame members through which extends the shackle bolt 7. This aperture may be made of the appropriate size and shape to fit the car to which the bumper is to be attached. The plates 3 extend forwardly beyond the end of the frame member and have upwardly projecting arms. At the base of the up-turned arm portion 9 each plate is provided with an aperture through which a rod 11 extends, the ends of the rod being threaded to receive a cap-nut 12 and a washer 13, bearing against the outer face of the plate 3. A tube 16 encircles the rod 11, extends between the two plates 3, and serves efficiently to space and brace them, thus ensuring an exceedingly firm support for the bumper elements. In each end of the tube there may be a bearing and centering member such as a plug 14 having a shoulder 15 against which the end of a tube 16 bears.

Pivotally supported at the upper end of each arm is a lever 26 so mounted as to swing in a horizontal plane. The connections between the lever and the arm include a member 19. This member is preferably U-shaped in plan, the legs engaging opposite sides of the arm and secured to the latter by a bolt 17. The front face is split at 20 so that its upper and lower bow or bend portions 21 and 22 can be adjusted toward and from each other. Each member 19 is also provided with small holes 23 to receive pins 24 which project into similar holes in the plates 3 to hold the member from turning on the bolt or in respect to the plate after it has once been fastened by the bolt. Through a horizontal opening 25 in the member extends the lever 26. This lever may be thickened along that portion passing through the clamping member 19 to provide sufficient gripping surface. A vertical opening 27 is formed between the bends 21–22, and through this opening extends a pivot pin or bolt 28 which also passes through the lever 26. If the lever 26 is too small for the depth of the opening 25 by inaccuracy in manufacture or by wear, the bolt 28 may be tightened to force the upper and lower bends 21 and 22 together to more effectively hold the lever 26 against other than swinging movement, and to give some resistance to said swinging if desired.

The inner ends of the two levers 26 are connected by resilient members such as a spring 30. Turnbuckles 29 may be used to regulate the tension of the spring if desired. The outer ends of the levers 26 are connected to the bumper bar. This is shown as including a pair of bars 31 and 32, disposed in spaced relationship in the same vertical plane, and each having its ends bent back to lie behind and spaced from the front or impact receiving portions. The ends of the bars come one above and the other below the ends of the levers and are connected to the latter by bolts or pins 33, passing vertically through the ends of the levers 26 and through loops in the ends of the bumper bars 31 and 32. If the bumper consists of one leaf such as 34, shown in Fig. 7, the ends of the levers are formed as yokes 35 carrying a bolt 36 which extends through a loop in the end of the leaf 34.

When the two leaves are used as illustrated in Figs. 1, 2 and 3, they extend across the front of the automobile, but are crossed at two points and are there held by clips 37. The leaves extend in parallel lines between these two points and also to the outermost extent of the length of the bumper beyond said points and around the bends and to the bolts 33 above mentioned. The connecting clips cause each bar to reinforce the other, but permit limited independent movement at the center and at the end of the impact surface.

The normal relations of the parts are shown in Fig. 1. It will be noticed that the bumper leaves, the levers and the spring 30 all move in horizontal planes when a collision occurs. In some constructions I might connect the ends of the levers by separate springs to fixed points of the chassis instead of connecting them together by a common spring as shown. When a body collides with the bumper the bars thereof are moved back. If the force of contact is small, the levers 26 will be moved only slightly around their pivots and the spring 30 will be stretched only ever so slightly without bending the bars except to pull the ends slightly toward each other. The resistance of the bumper to a force which is small is mainly that of the spring 30, whereas if the force is large the stretch of the spring will increase and its resistance will correspondingly increase. If the leaves are pushed far enough back to bear against the ends of the members 19, the ends and middle of the bars may bend, and thereby add the natural resistance of the bars to that already furnished. All these actions it must be observed take place in a horizontal plane and the bumper being disposed in front of the supporting plates or brackets and the clamping members protect the latter.

It will therefore be observed that I have provided a simple, strong, durable bumper construction in which the bumper bar is connected at its rear, inturned ends to resilient means, and adapted for movement in a horizontal plane.

Having thus described my invention, what I claim as new and desire to secure by Letters Patent is:

1. A bumper element for vehicles, which includes a pair of bars extending one above the other across the front of the vehicle, the ends of the bars being bent back and turned in toward each other, and connected to the frame of the automobile, said bars crossing each other at a plurality of points.

2. A bumper element for vehicles, which includes a pair of bars extending parallel to each other across the vehicle between the planes of the frame members of the vehicle, said bars being crossed at these planes, then extending parallel to each other to the full length of the bumper, and then bent back on each other still parallel and connected to the frame of the vehicle.

3. A bumper element for vehicles, which includes a pair of bars extending parallel to each other across the vehicle between the planes of the frame members of the vehicle, said bars being crossed at these planes, then extending parallel to each other to the full length of the bumper.

4. A device for supporting vehicle bumpers, including a pair of plates disposed along the outer surfaces of the side frame members of the vehicle, each plate having an aperture therein to embrace the shackle bolt on the end of the frame member, means for securing the rear end of the plate to the frame member, a transversely extending tie rod normally preventing movement of the plates away from each other and away from said frame members, said plates each having an arm portion integral therewith and in the same plane, and extending upwardly from said tie rod, adjustable clamping members carried by said arm portions at their upper ends, and adapted to support the bumper bar.

5. A device for supporting bumper bars, including a pair of substantially L-shaped plates each including an upwardly extending arm and an approximately horizontally extending arm, means for securing said horizontally extending arms to the forwardly projecting frame members of a vehicle, a tie member rigidly connecting said plates at approximately the intersection of the upwardly and horizontally extending arm portions, and means at the upper ends of said upwardly extending arm portions for supporting the bumper bar.

6. A bumper device for automobiles which comprises a bumper leaf extending across the front of the automobile, a pivoted lever mounted on the end of each frame member of the automobile, the ends of the leaf being bent back and connected to the levers, and a spring connecting the other ends of the levers.

7. A bumper device for automobiles which comprises a bumper leaf extending across the front of the automobile, a pivoted lever mounted on the end of each frame member of the automobile, the ends of the leaf being bent back and connected to the levers, and a spring connecting the other ends of the levers, all of said elements being disposed and acting in a horizontal plane.

8. A bumper device for automobiles which comprises a leaf having an end bent back on itself, a lever pivoted intermediate of its ends to the end of the frame member of the automobile adjacent said end of the leaf and adapted to swing in a horizontal plane, said end being connected to the lever, and a spring connected to the other end of the lever to resist the motion of the lever under the influence of a force applied through the leaf.

9. A fastening device for automobile bumper constructions which comprises a plate fastened to the end of a frame member of the automobile the end of the plate being apertured, a U-shaped clamping member fastened to opposite sides of the plate, and having vertical and horizontal apertures therein, the bend of the member being split to form two adjacent bends, a lever extending through the horizontal apertures in the member and a vertical bolt passing through the lever to act as a pivot for the same, said bolt adapted to be tightened to draw the bends of the member together to grip the lever when desired.

10. A fastening device for automobile bumper constructions which includes a pair of members adapted to be fastened to the vehicle frame, a pair of clamping members each having a vertical slot adapted to receive one of said first mentioned members and having a horizontal slot, a pair of levers one pivoted in each of said last mentioned slots and a bumper bar carried by said levers.

Signed at New York, in the county of New York and State of New York, this 30" day of September, A. D. 1922.

JOHN M. COOTE.